May 25, 1954  R. F. PRIBIL ET AL  2,679,367
TRIM TAB CONTROL MECHANISM

Filed March 28, 1950  2 Sheets-Sheet 1

Richard F. Pribil &
Sanford Falbaum
   *INVENTORS*

BY *James M. Clark*

THEIR PATENT ATTORNEY.

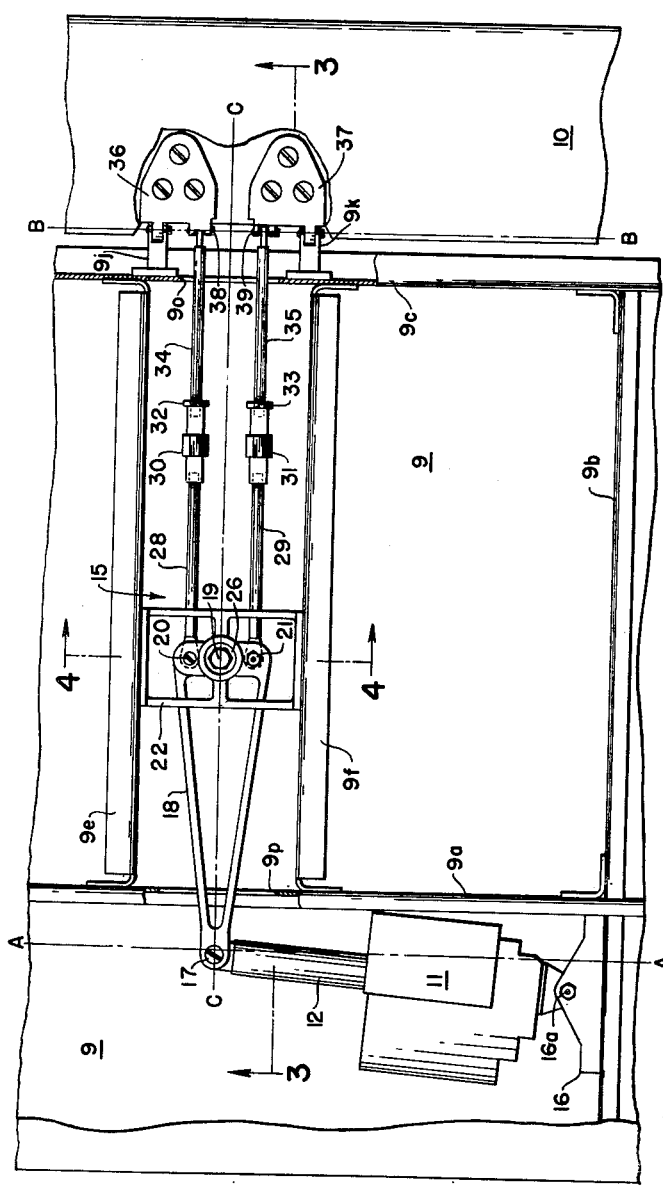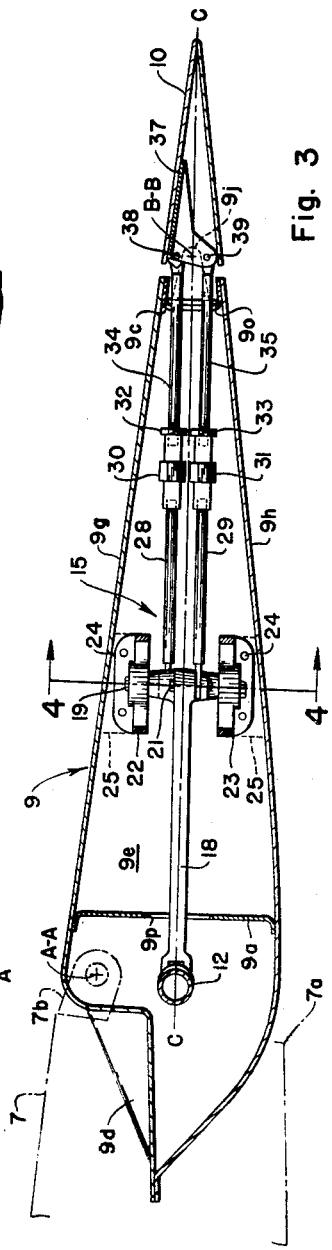

Patented May 25, 1954

2,679,367

UNITED STATES PATENT OFFICE 2,679,367

TRIM TAB CONTROL MECHANISM

Richard F. Pribil, Palos Verdes Estates, and Sanford Falbaum, Hollydale, Calif., assignors to North American Aviation, Inc.

Application March 28, 1950, Serial No. 152,394

2 Claims. (Cl. 244—82)

This invention relates generally to controls and more particularly to improvements in control mechanisms for aircraft and the like.

It is frequently desirable in the control of large aircraft and of those aircraft which operate at higher speeds, to provide the control surfaces with adjustable tabs which are usually located in the region of the trailing edge of a control surface. These control tabs may either be of the trim type in which they assist the pilot in balancing or trimming the airplane, or they may be of the servo-type in which they assist the pilot forces in displacing the control surface upon which the tab may be mounted or to which the tab may be operatively connected.

In the mounting of tabs and control surfaces, as well as in the operating mechanisms for each, a small amount of play or back-lash is normally encountered at each bearing or pivotal connection, due to clearances and tolerances, resulting in a degree of flexibility and looseness being imparted to the tabs or to the surface. This play or back-lash gives rise to a fluttering condition of the surface, or even both surfaces during flight. Inasmuch as at critical speeds such flutter may become destructive and extremely undesirable, modern aircraft designed for the current high speed ranges cannot tolerate any back-lash and play which is likely to cause such flutter conditions. In addition, the flutter effects may impair the flight characteristics, or performance of an airplane, reducing its top speed at low Mach numbers.

In aircraft operating at extremely high speeds no fluttering or oscillation can be tolerated in such elements as the trim tabs and even very minor oscillations in these control surfaces may rapidly become destructive. During high speed flight very small play in the trim tab can give rise to a flutter which in turn will tend to oscillate the control surface and even the entire wing, rapidly becoming of sufficient magnitude to result in structural failure. Prior to the advanced stage where it becomes destructive, control surface flutter is also transmitted directly to the pilot through the control system and may render the aircraft uncontrollable. Previous attempts have been made to reduce or minimize the clearances contributing to back-lash or play in such installations and these attempts have included the use of extreme precision bearings which proved very costly to manufacture and to install. Other prior efforts included installation of such bearings by means of a steel pin through the central hole of the bearing in which the pin was upset or riveted upon installation causing it to swell and completely fill the hole, in some instances actually spreading the inner bearing race and causing a degree of deformity. While certain of such prior installations initially provided the minimum play required, rapid wear was usually experienced and no means for correcting this wear was available other than the complete replacement of the entire installation, inasmuch as the riveted bearing could not readily be disassembled or readjusted.

The present invention overcomes the shortcomings and objections of the prior attempts and previous efforts to minimize and eliminate play and back-lash in such installations by the provision of a unique actuating unit mounted entirely within the control surface and including a rockable element connected to a pair of opposed adjustable length control rod elements connected to the tab surface. By adjusting the length of one or both control rod elements they may be pre-loaded to an extent which eliminates the effects of any looseness in the several locations where bearings, hinges, and joints occur, inasmuch as each of these individual points will be drawn into tight contact by the tensioning or pre-loading. This double rod type arrangement provides a simple and effective means for eliminating back-lash with the two opposed members each being in tension (or alternatively in compression) and any play which initially may have been present will have no resultant effect on the completed installation. The improved arrangement provides an additional advantage through the compact form of the mechanism which can be readily adapted to the space available within the relatively thin structure of the control surface while at the same time providing sufficient throw for full travel of the tab. The improved mechanism has proven far superior to the use of cables in such installations inasmuch as cables do not serve the purpose adequately in view of their being susceptible of excessive elongation. The control rods used in the present mechanism are frequently called upon to transmit loads in flight as high as 2000 pounds and cables, even when rigged with considerable tension, exhibit undesirable tendencies for further elongation.

It is, accordingly, an object of the present invention to provide an improved mounting and actuating mechanism for tabs and other like surfaces. It is a further object to provide an improved tab actuating mechanism in which looseness of the tab and back-lash and play in the tab mounting and actuating mechanism is minimized or eliminated to a greater degree than heretofore. Another object of the invention resides in an improved tab mounting and control mechanism which substantially prevents flutter or oscillation of the tab and its associated control surface. A further object resides in the provision of an improved control mechanism in which the use of cables and their attendant objectionable characteristics are eliminated. Another object of this invention resides in the provision of a simple, rigid and foolproof mechanism which can be readily tensioned, rigged or changed in length to eliminate or extensively minimize back-lash and play in the installation. It is a still further object to provide such a tab actuating mechanism which can be readily adjusted and checked as well as to have its original degree of tightness restored at any time to eliminate or take up the play resulting from wear in the installation.

Other objects and advantages of the present invention will occur to those skilled in the art after reading the following description, taken in conjunction with the accompanying drawings forming a part hereof, in which:

Fig. 2 is an enlarged plan view of the mechanism shown in Fig. 1;

Figure 1:
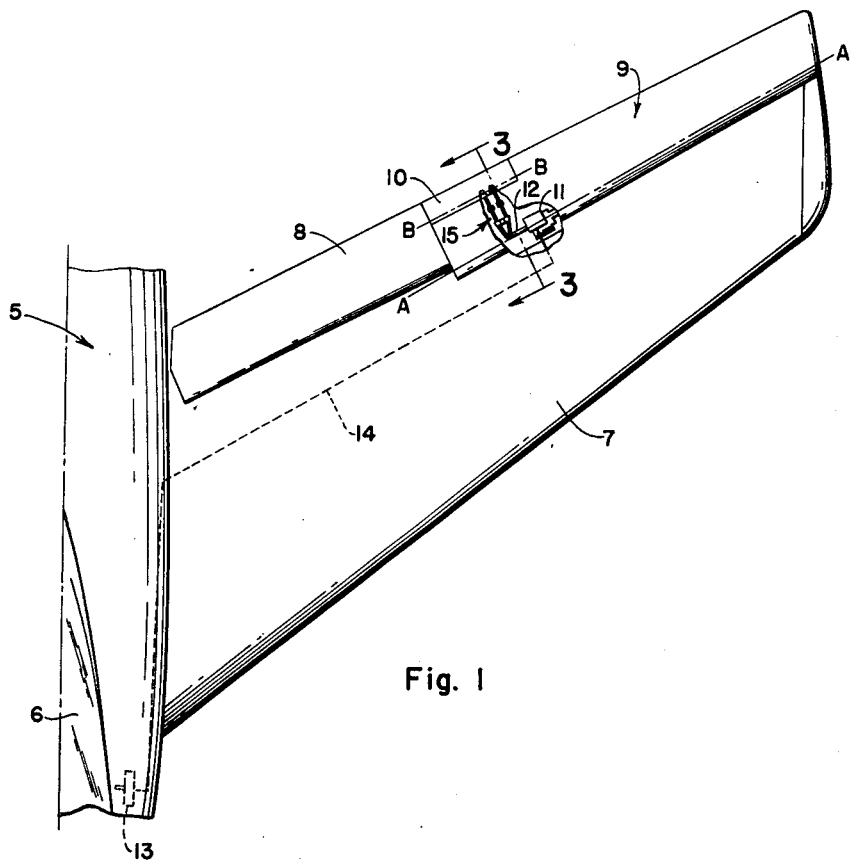
Fig. 1 is a plan view of a wing of an airplane to which an improved form of the present tab control mechanism has been applied.
Figure 4:
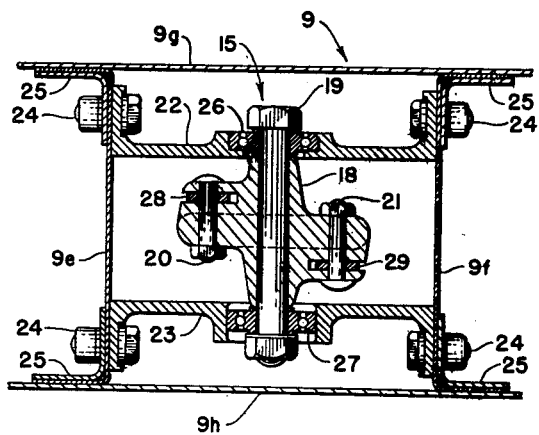

Fig. 3 is a similarly enlarged sectional elevation of the same mechanism and structure as taken along the lines 3—3 of Figs. 1 and 2; and Fig. 4 is a still further enlarged sectional view of the actuating mechanism as taken along the lines 4—4 of Figs. 2 and 3.

Referring now to Fig. 1, the numeral 5 represents a portion of the fuselage of an airplane provided with a pilot compartment or cockpit covered by a canopy indicated at 6, and having a pair of laterally extending wings, the left one of which is indicated by the numeral 7. The wing 7 is preferably provided with a high lift flap indicated at 8, and an aileron 9 for purposes of lateral control. The aileron is operable about the spanwise extending axis A—A and to the trailing portion of which there is operatively mounted a trim tab 10, pivotable about the spanwise axis B—B. The tab 10 is operated or deflected up and down with respect to the aileron 9 by means of a reversible electric motor 11 operating an extensible and irreversible screw jack shaft 12. The electric motor 11 is preferably controlled from the cockpit 6 by means of the control switch 13 in circuit with the wiring indicated at 14. The motor driven jack shaft 12 is connected to the tab actuating mechanism which is indicated generally in Fig. 1 by the numeral 15 and is shown in greater detail in the succeeding figures.

Referring now more particularly to Figs. 2 and 3, the aileron 9 is pivotally supported adjacent the trailing edge 7a of of the wing 7 by means of the hinge fittings 7b adjacent the upper surface of the wing 7 and the aileron 9, such that the control surface is rotatable about the spanwise axis A—A. The aileron 9 includes a main spar 9a, fore and aft of which extends a plurality of chordwise extending balkheads 9b. The trailing edges of the aileron adjacent the inset tab 10 terminates in a channel shaped rear spar 9c and the leading edge structure of the aileron is indicated at 9d, being disposed within the trailing portion of the fixed wing 7. Between the front and rear spars 9a and 9c of the aileron structure, there are located a pair of supporting bulkheads 9e and 9f suitably framed and attached to the spars and extending vertically between the upper and lower skins 9g and 9h of the aileron, respectively, provided for the support of the tab actuating mechanism 15.

The electric motor 11 is supported from a fitting 16 attached to the bulkhead or diaphragm 9b, the motor being pivotally supported at the vertical pivot 16a. The outer end of the extensible screw jack shaft 12 is pivotally attached at 17 to the rockable arm member 18 extending through the opening 9p in the front spar 9a. The rockable arm 18 is triangular in plan form with its pivotal connection 17 at its apex and it is pivotally mounted by means of the vertical pin 19 at the center of the base portion of its triangular form. The rocking arm member 18 is provided within its base portion, adjacent the bored hub which receives the pin 19, with laterally disposed apertures to receive the pivot pins 20 and 21. The vertical pivot 19 is supported between the channel fittings 22 and 23, which are bolted through their flanges to the bulkheads 9e and 9f by means of the attachment bolts 24 which also extend through the inwardly directed flanges of the angular supporting elements 25, the remaining flanges of which are attached to the skin elements 9g and 9h. The channel fittings 22 and 23 are provided with suitable recesses for receiving the anti-friction ball bearings 26 and 27 within which the vertical pin 19 is free to rotate upon a vertical axis and about which the rocker arm member 18 is permitted to be rocked by the motor 11 and its jack shaft 12.

Extending rearwardly from the rocker member 18 are the adjustable tie-rod portions 28 and 29, the forward terminals of which are pivotally connected to the pivots 20 an 21, respectively. The rods 28 and 29 are threadedly attached to the adjustment barrels 30 and 31, to the aft ends of which the further tie-rod portions 34 and 35 are threadedly attached and locked in their adjusted positions by means of the jam or lock nuts 32 and 33, respectively. The tab surface 10 is provided internally with fittings 36 and 37 having forwardly extending hinge portions 38 and 39, which are pivotally connected to the aft terminals of the tie-rods 34 and 35, respectively, by suitable pin connections. The tie-rods 34 and 35 extend through the opening 9o in the web of the rear spar 9c, to which web are also attached the trim surface hinge brackets 9j and 9k, also suitably pinned to the fittings 36 and 37. The hinge brackets 9j and 9k, extending from the rear spar 9c of the aileron 9, have spanwise aligned apertures for the hinge pin connections to the tab 10 such that the latter is caused to rotate about the spanwise axis B—B, whereas the pivotal connections 38 and 39 to the fittings 36 and 37 are disposed above and below the hinge axis B—B such that the tie-rod assemblies 28—34 and 29—35 are disposed both vertically and laterally, or in the spanwise direction, with respect to each other. Accordingly, in the neutral position of the tab 10 shown in Fig. 3, both tie-rod assemblies are substantially horizontal and parallel to each other. This vertical and lateral offset relationship of the tie-rod assemblies is accommodated by the shape or form of the aforementioned base or hub portion of the rocker member 18 as shown in detail in the section in Fig. 4. In this figure, it will be noted that the forward terminal of the tie-rod 28, while disposed at an equal radius from the axis of the pin 19 as that of the forward terminal of the tie-rod 29, it is disposed appreciably above the mid-portion of the vertical height of the hub portion of the rocker element 18, while the forward terminal of the tie rod 29 is disposed a similar distance beneath this mid-portion. The actuating mechanism 15 is accordingly symmetrical above the fore and aft axis C—C.

When the tab assembly is installed, the tie-rod assemblies 28—34 and 29—35 are placed under a relatively high rigging load by means of the tension adjustments which are maintained by means of the lock or jam nuts 32 and 33. This tends to take up any clearance or play which may exist in the bearings between the hinge brackets 9j and 9k, and the hinge fittings 36 and 37; in the bearings in the rockable arm at 19 and the connections at 20 and 21 at the forward ends of the tie-rod or link assemblies; and at the tab connections 38 and 39 at the rear ends of the tie-rod assemblies. Current airplane designs intended for flight at relatively high speeds now require that not more than .050 inch to .060 inch of play be measured at the trailing edge of the tab under "no load" conditions, as with the airplane at rest upon the ground. As a general rule 1 per cent of the chord of the tab, or less, may be allowable for the initial installation plus a further 50 per cent of that amount for wear in service. In the installation illustrated in the drawings, the control rod members are tensioned and pre-loaded to approximately 600 pounds tension, and this results in eliminating the effects of any looseness in the several locations where the bearings, hinges, and pivotal joints occur, inasmuch as each of these individual points may be drawn into tight contact by this tensioning operation. Any play which may initially have been present will have no resulting effect on the completed installation, and aside from slightly increased friction loads in these bearings, no increase in the required control forces is encountered. The use of the double tie-rod installation described eliminates the spring factor normally present in cable installations which usually result from high elongation characteristics. The dual tie-rod design also permits obtaining a considerably greater tab angle deflection, which is limited in conventional designs by the necessity of keeping the mechanism inside the control surface envelope. High speed aircraft now use extremely thin wings and control surfaces which present increased problems in obtaining adequate movement owing to space limitations.

The operation of the improved tab control mechanism is as follows: When it is desired to rotate or displace the tab 10 in a given direction, the control switch 13 within the cockpit of the airplane is moved in the required direcion, initiating operation of the motor 11 and extension or retraction of its screw jack shaft 12 thereby imparting rocking of the member 18 about the vertical axis of its pivotal mounting 19. In the event, for example, it is desired that the tab 10 be rotated or deflected downwardly the operation of the motor 11 will cause extension of the shaft 12 and rocking of the member 18 in the clockwise direction as viewed in Fig. 2. The pivotal connection 21, pulling the tie-rod assembly 29—35 forwardly or to the left and causing forward movement of the lower pivotal connection 39, imparts clockwise downward deflection to the tab 10 as viewed in Fig. 3. It will be obvious that to return the tab 10, or remove the same upwardly, the reversible motor 11 will be operated for rotation in the opposite direction causing retraction of the screw jack shaft 12, counterclockwise rotation of the rocker arm 18 about the pivot 19 and forward pull of the link or tie-rod assembly 28—34 pulling the upper portion of the tab 10 forward and imparting counterclockwise rotation as viewed in Fig. 3.

It will, accordingly, be noted that the foregoing improved arrangement provides for the distinct betterment of critical tab condition to increase the speed range of aircraft by the reduction of flutter at high mach numbers. It also provides for large tab angle travel while maintaining an aerodynamically clean installation in which all of the actuating mechanism is housed completely within the profile of the control surface. The present arrangement affords a simple construction which eliminates the need for high precision, close tolerance bearings and the like with their attendant cost and production problem. The improved mechanism which has been described attains all of these and other results with a relatively little increase in weight of the installation. While the rod adjusting means has been referred to as a shortening or tensioning means, it is by no means limited thereto and in certain instances where it is desirable these operating elements may be placed in compression and suitable cross-sections, such as tubular rods, provided. It will also be obvious that the desirable results of this invention may be obtained by the use of but one adjustable rod or link element and one fixed length element inasmuch as adjustment of the first will pre-load the second element. The tab shown may nominally have an angular movement of about 15° above and 15° below the neutral position and suitable limit stops (not shown) may be provided to restrict the throw to these or other desired angles of movement.

Other forms and modifications of the present invention, both with respect to its general arrangement and the details of its respective parts, which will occur to those skilled in the art, are intended to come within the scope and spirit of this invention as more particularly defined in the appended claims.

We claim:

1. In flutter prevention mechanism for high speed aircraft having a main airfoil, a control surface pivotally mounted upon said airfoil upon a spanwise extending axis, a tab pivotally mounted upon said control surface, a rockable actuating element pivotally mounted within said control surface upon an axis extending in the direction of the thickness of said control surface, said rockable element having opposed pivotal connections spaced in the direction of the axis of its pivotal mounting within said control surface, said tab having opposed pivotal connections spaced thereon in the spanwise direction and disposed at either side of the pivotal mounting of said tab, a push-pull link pivotally connected to one of the pivotal connections of said rockable element and to one of the pivotal connections of said tab, a second push-pull link connected to the remaining pivotal connection of said rockable element and to the other of said pivotal connections of said tab, said links being disposed to extend in parallelism to each other substantially at right angles to the axis of pivotation of said rockable element, the said links being spaced from each other in the direction of the axis of the rockable element, adjustment means associated with at least one of said push-pull links arranged for pre-tensioning said links to reduce the clearance play within each of said pivotal connections and mountings having axes extending in both the spanwise and thickness directions of said control surface, said pre-tensioning limiting the deflection play at the trailing edge of said tab to not more than one per cent of the chord length of said tab, and an extensible actuating motor pivotally supported at a fixed terminal to said control surface with its mass supported beneath the pivotal mounting of said control surface and having a movable terminal pivotally connected to said rockable element substantially beneath said control surface pivotal mounting for imparting controlled movements to said tab with respect to said control surface with freedom from flutter and oscillations at high speeds of the aircraft.

2. In flutter prevention mechanism for high speed aircraft having a relatively fixed airfoil, a movable control surface pivotally mounted upon said airfoil upon a spanwise extending axis, and a tab pivotally mounted upon said control surface, a rockable actuating element pivotally mounted within said control surface upon an axis extending in the direction of the thickness of said control surface, said rockable element having opposed pivotal connections spaced in both the spanwise and thickness directions in relation to the axis of its pivotal mounting within said control surface, said tab having opposed pivotal connections spaced in the spanwise direction and disposed at either side of the pivotal mounting of said tab, a push-pull link pivotally connected to one of the pivotal connections of said rockable element and to one of the pivotal connections of said tab, a second push-pull link connected to the remaining pivotal connection of said rockable element and to the other pivotal connection of said tab, said links being disposed to extend in parallelism to each other substantially normal to the axis of pivotation of said rockable element, the said links being spaced from each other in the direction of the axis of the rockable element, and said links being of adequate cross-section to withstand appreciable tensile forces in excess of the force necessary to move said tab in flight, adjustment and locking means associated with at least one of said push-pull links arranged for pre-tensioning said links to reduce the clearance play within each of said pivotal connections and mountings having axes extending in both the spanwise and thickness directions of said control surface, said pre-tensioning limiting the deflection play at the trailing edge of said tab to not more than one per cent of the chord length of said tab, and an extensible irreversible actuating motor pivotally supported at a fixed terminal to said control surface with its mass supported beneath the pivotal mounting of said control surface and having a movable terminal pivotally connected to said rockable element substantially beneath said control surface pivotal mounting for imparting controlled movements to said tab with respect to said control surface free of flutter and oscillations at high speeds of the aircraft.

References Cited in the file of this patent

UNITED STATES PATENTS

| Number | Name | Date |
|---|---|---|
| 1,315,126 | Hornick | Sept. 2, 1919 |
| 1,452,554 | Gardner | Apr. 24, 1923 |
| 2,325,548 | Roos et al. | July 27, 1943 |
| 2,357,465 | Focht | Sept. 5, 1944 |
| 2,443,393 | Landgraf | June 15, 1948 |

FOREIGN PATENTS

| Number | Country | Date |
|---|---|---|
| 572,494 | Great Britain | Oct. 10, 1945 |